US00RE37167E

(19) United States
(12) Reissued Patent
Wilson

(10) Patent Number: US RE37,167 E
(45) Date of Reissued Patent: May 8, 2001

(54) FATIGUE RESISTANT DRILL PIPE

(75) Inventor: Gerald E. Wilson, Montgomery, TX (US)

(73) Assignee: Grant Prideco, Inc., The Woodlands, TX (US)

(21) Appl. No.: 09/301,388

(22) Filed: Apr. 27, 1999

Related U.S. Patent Documents

Reissue of:
(64) Patent No.: 5,853,199
Issued: Dec. 29, 1998
Appl. No.: 08/529,517
Filed: Sep. 18, 1995

(51) Int. Cl.[7] ..... F16L 15/00; F16L 29/00; C21D 1/18

(52) U.S. Cl. ..... 285/45; 3/288.1; 3/333; 3/422; 175/325.1; 148/519

(58) Field of Search ..... 285/333, 334, 285/390, 355, 422, 45, 288.1; 148/12 F, 124, 327, 334, 519, 521; 138/109; 175/325.1, 325.2

(56) References Cited

U.S. PATENT DOCUMENTS

| | | |
|---|---|---|
| 2,239,826 | 4/1941 | Neuhaus . |
| 2,969,845 | 1/1961 | Hester . |
| 3,067,593 | 12/1962 | McCool . |
| 3,080,179 | 3/1963 | Huntsinger . |
| 3,484,122 | 12/1969 | Schellstede et al. . |
| 3,754,609 | 8/1973 | Garrett . |
| 3,773,359 | 11/1973 | Chance et al. . |
| 3,784,238 | 1/1974 | Chance et al. . |
| 4,002,359 | 1/1977 | Lari . |
| 4,089,455 | 5/1978 | Fellers . |
| 4,151,018 | 4/1979 | Bolton . |
| 4,416,476 | 11/1983 | Garrett . |
| 4,445,265 | 5/1984 | Olson et al. . |
| 4,453,986 | 6/1984 | Sponseller et al. . |
| 4,674,171 | 6/1987 | DeCell et al. . |
| 4,740,255 | 4/1988 | Manton . |
| 4,745,977 | 5/1988 | Love et al. . |
| 5,040,827 | 8/1991 | DeLange . |
| 5,050,691 | 9/1991 | Moses . |
| 5,286,069 | 2/1994 | Wilson . |
| 5,328,529 | 7/1994 | Cordea et al. . |
| 5,509,480 | 4/1996 | Terrell et al. . |
| 5,562,312 | 10/1996 | Carlin . |

*Primary Examiner*—Eric K. Nicholson
(74) *Attorney, Agent, or Firm*—Browning Bushman; Carlos A. Torres

(57) ABSTRACT

A tubular drill pipe section to be used in a well bore is disclosed. The drill pipe section includes upper and lower tool joints, a main steel tubular portion extending upwardly from the lower joint and terminating near the upper tool joint, and an elongated steel protector tube extending downwardly from the upper tool joint and secured to the upper end of the main portion. The main portion has a much lesser wall thickness throughout substantially its entire length than the protector tube. The protector tube is made of AISI 4100 series chrome-molly steel that is quenched and tempered to give it high strength and high hardness (30–38 $HR_c$) with a Martensite small, close knit, grain size. This hard material reduces the penetration of the slip teeth into the wall of the pipe section and increases the fatigue life of the protector to beyond that of the main steel tubular portion.

5 Claims, 11 Drawing Sheets

| FATIGUE TEST RUN DATA - CHRONOLOGICAL | | | | | | | |
|---|---|---|---|---|---|---|---|
| TEST NUMBER | START DATE | SPECIMEN NUMBER | DESCRIPTION | IDENTIFIER ON PLOT | LOAD (LBS) | FAILURE LOCATION | CYCLES TO FAILURE |
| 7 | 8/17/94 | 1 | XLT | XLT | 2190 | n3 | 187430 |
| 8 | 8/19/94 | 4 | SPT 3-1/4 ID | SPT | 2480 | 18° | 674005 |
| 9 | 8/24/94 | 2 | XLT | XLT | 2350 | n3 | 184499 |
| 10 | 8/26/94 | 5b | SPT 3-1/4 ID | SPT | 2480 | n1 | 1540327 |
| 11 | 9/1/94 | 3 | XLT | XLT | 2290 | n2 | 198834 |
| 13 | 9/7/94 | 6b | SPT 3-1/4 ID | SPT | 2480 | 18° | 646713 |
| 15 | 2/6/95 | 7 | SPT 3-1/2 ID | SPTb | 2480 | n1 | 1101451 |
| 16 | 2/13/95 | 8 | SPT 3-1/2 ID | SPTb | 2480 | 18° | 620153 |
| 17 | 2/17/95 | 9 | SPT 3-1/2 ID | SPTb | 2480 | 18° | 441970 |
| 18 | 2/22/95 | 10 | SPT 3-1/2 ID POLISHED | SPTb | 2480 | n1 | 1278936 |
| 19 | 3/2/95 | 11 | SPT 3-1/2 ID W/LSG | SPT-LS | 2480 | n1 | 989821 |

FATIGUE RESISTANT DRILL PIPE

Matter enclosed in heavy brackets [ ] appears in the original patent but forms no part of this reissue specification; matter printed in italics indicates the additions made by reissue.

This invention relates to drill pipe generally and, in particular, to drill pipe used in drilling deep wells, such as wells over 10,000 ft. deep.

Oil and gas producers are having to drill deeper and deeper wells as they strive to maintain or increase their reserves of oil and gas. Wells 10,000 to 15,000 ft. deep have been common for many years. Today, wells 28,000 to 30,000 ft. deep are becoming more commonplace.

Drill bits on the end of a drill string drill the wells. Drill bits have a finite life and have to be replaced periodically. This means that the entire string of pipe must be pulled from the well to allow a new bit to be installed on the lower end of the string after which the drill string is run back into the hole. This operation is referred to as a "round trip" or "trip" for short. During a trip the pipe will usually be pulled in stands of multiple joints. Each stand is unscrewed from the pipe string and set back in the derrick until the stand is subsequently reconnected into the string as the pipe is run back into the hole. After each stand is pulled from the well, the portion of the pipe string that remains in the hole is supported in the rotary table by slips as the stand is disconnected and set back in the derrick. The same situation exists when each stand is being reconnected into the string. The slips have inserts with teeth that are forced against the wall of the pipe by the wedging action between the slips and the slip bowl. To support the pipe, the teeth will have to cut notches in the wall of the joint of pipe in the slips. The pipe is not only subjected to notching by the slips during a trip but also whenever a joint of pipe is added to the string during drilling operations. This operation begins with the weight of the pipe string being supported by slips that engage the top joint in the string just below the upper tool joint while the kelly or power swivel is disconnected from the top joint. Another joint is then connected to the top joint and the pipe string is lowered until the new joint can be supported by the slips. The kelly or power swivel is then reconnected and drilling resumes.

In addition to the problem of the slip marks or notches, the slip area of a joint of drill pipe is subjected to increasing compressive hoop stress when supporting a string of drill pipe in the rotary table due to the increasing length and weight of drill strings as wells are being drilled to greater depths.

Thus, the slip area of the pipe, i.e., the area of the pipe engaged by the slips, usually an area about 24 to 36 inches long the top of which is about 28 to 32 inches below the upper tool joint, is repeatedly subjected to notching by the slip teeth. These notches or slip marks accumulate over time and eventually require the pipe to be downgraded because of reduced wall thickness or retired because of cracks in the slip area. Slip marks can also result in a premature failure of the drill pipe. At a time when oil and gas prices are low, preventing drill pipe failures may make the difference in showing a profit or a loss in drilling a new well. The most common cause of drill pipe failure is fatigue.

It is well known that steel fails under repeated loading and unloading, or under reversal of stress, at stresses smaller than the ultimate strength of the steel under static loads. The magnitude of the stress required to produce failure decreases as the number of cycles of stress increase. This phenomenon of the decreased resistance of steel to repeated stresses is called "fatigue". Drill pipe that is rotated while bent is subjected to a reversal of stress every 180° of rotation. As long as the stress is uniform in the pipe and below the endurance limit of the steel, the pipe will last forever. theoretically. If, however, there is a stress concentration produced by a change in the cross-section or by a local defect such as a notch cut in the wall of the pipe by slip teeth, a fatigue crack can appear. Once formed, the crack spreads due to the stress concentrations at its ends. This spreading progresses under the action of the alternating stresses until the cross-section becomes so reduced in area that the remaining portion fractures suddenly under the load.

New upset designs and new tool joint designs have improved the fatigue life of drill pipe, but we still have slip damage, which prevents the full benefit of these innovations from being achieved. It so happens that slip damage is located in or near the high stress area of the upset fadeout on the box end or the pin end if the pipe is run with the pin up. As discussed above, slips are designed to bite into the pipe and hold it from sliding down the hole, while a connection is being made up. Slip damage can be more severe if the pipe is allowed to turn in the slips or if the slips and slip bowl are not properly maintained. Slip cuts cause stress risers which in turn generate cracks and fatigue failures.

U.S. Pat. No. 3,080,179 that issued Mar. 5, 1963 to C. F. Huntsinger proposed a drill pipe construction that would include a thick-walled "protector tube" in the slip area of the drill pipe to solve the slip damage problem. Specifically, Huntsinger proposed:

> "an elongate steel protector tube extending downwardly from said upper tool joint and secured to the upper end of said main portion, said main portion having a much lesser wall thickness throughout substantially its entire length than said protector tube and being made of a steel having substantially greater hardness and unit tensile and torsional strength than the steel of said protector tube, . . . said protector tube being disposed in said drill pipe section at a location for engagement by supporting slips at the top of the well bore, the cross-sectional area of said protector tube being such that the total tensile and torsional strength of said protector tube is no less than the total tensile and torsional strength of said main portion, whereby said protector tube has less notch sensitivity and greater resistance to inward crushing than said main portion."

Huntsinger obtains "less notch sensitivity" in the protector tube by reducing the hardness of the metal in the protector tube below that of the main portion of the drill pipe. At line 62, col. 6, Huntsinger states with reference to FIGS. 2 and 5:

> "The fact that the protector tube portion 20a is not as hard as the main portion 18a of the drill pipe section renders it less susceptible to notching, minimizing, if not fully eliminating, fatigue failures." (emphasis added)

In fact, Huntsinger emphasized many times in his patent that the primary improvement of his patent came from the reduction of hardness and the subsequent decrease in the notch sensitivity of the material in the protector tube. Huntsinger recommends a protector tube made from grade E tubing with a chemistry which is equivalent to AISI 1040 carbon steel. This is a high carbon, normalized material that is relatively soft. Its micro-structure has large grains, which result in the metal having low impact strength (low toughness). Drill pipe slips would cut deeply into this material greatly reducing the wall thickness of a protector tube made of this weak material and cause it to fail in fatigue in a short time.

It is therefore an object and feature of this invention to provide a protector tube for drill pipe that is made of steel having high strength and high hardness with a small, close knit grain size (called martensite). This hard material (30–38 HRc) reduces the penetration of the slips and thereby increases the wall thickness under the shallow notches, made by the slips, when compared to the soft material recommended by Huntsinger. This increased area would result in less bending stress per unit area. The improved microstructure of the martensitic material will also be resistant to crack initiation and its high toughness will be more resistant to crack propagation. Fatigue testing of full scale test specimens, with the protector tube of this invention, showed that with slip damage, it will last more than 600% longer than standard drill pipe with the same slip damage.

It is another object and feature of this invention to provide a joint of drill pipe with a thick-walled protector tube made of steel having high strength and high hardness in the slip area to thereby not only reduce the stress level in the slip area but to better withstand the crushing effect of the slips when supporting a long drill string.

It is a further object of this invention to provide a drill pipe with a second thick-walled protector tube made of steel having high strength and high hardness between the tool joint pin and the tube section, so the pipe can be run with the pin up instead of the box up.

These and other objects, advantages, and features of this invention will be apparent to one skilled in the art from a consideration of this specification, including the attached drawings and the appended claims.

Figure 5:
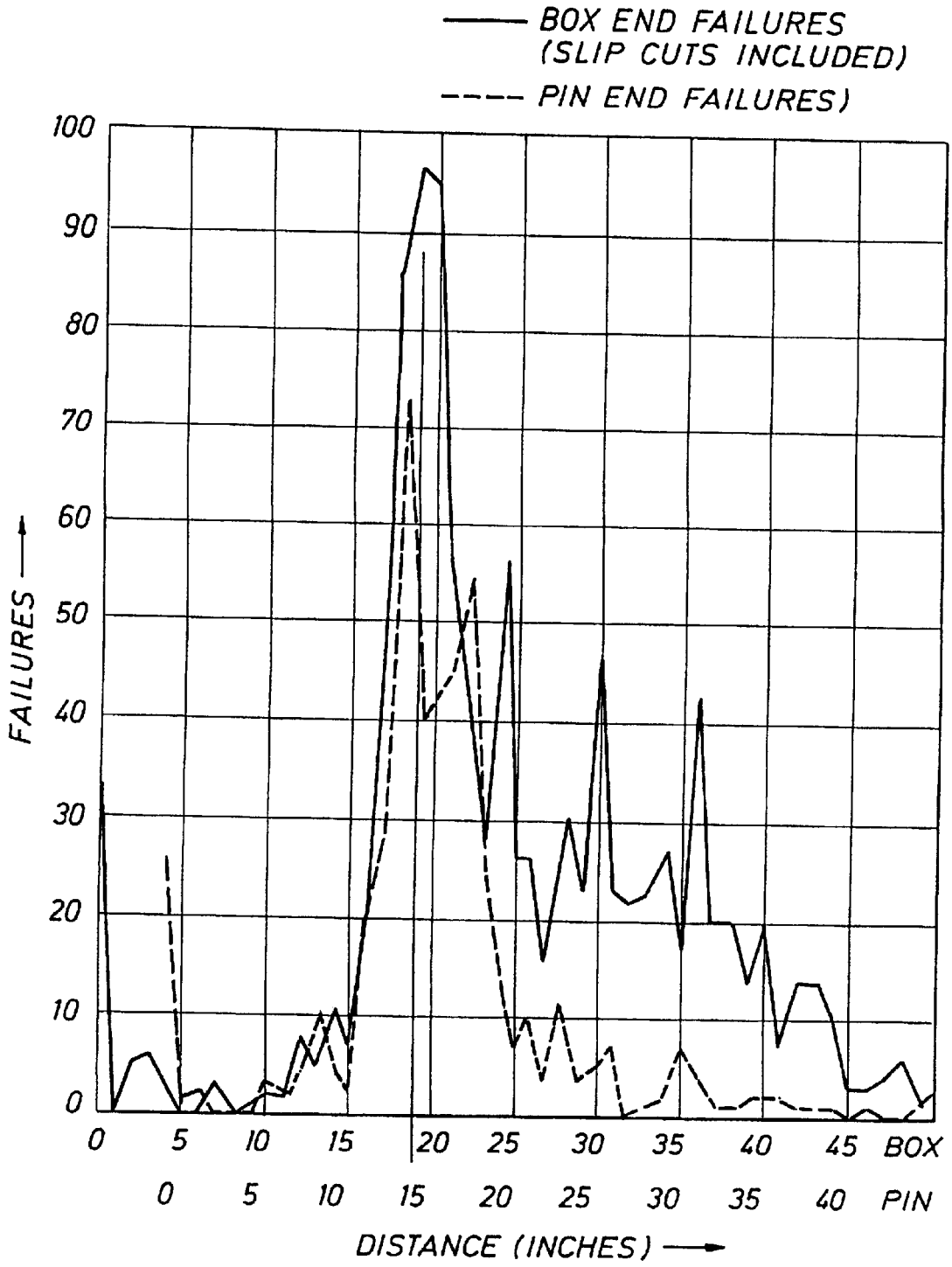
FIG. 5 is a graph showing box end failures of drill pipe with slip cuts included and pin end failures.

FIG. 5 is a graph showing drill pipe box end failures (slip cuts included) and drill pipe pin end failures. This graph is from a paper entitled API/IADC, DRILL PIPE FAILURE DATA BASE, FINAL REPORT, Sep. 23, 1990. The paper was presented at the IADC's annual conference at New Orleans, La. on or about Sep. 23, 1990.

Both the pin end and the box end are subjected to the same bending stresses and therefore will fail in fatigue at about the same rate. This is confirmed by how close the curves follow each other for the first fifteen inches from the end of the box and the first ten inches from the shoulder on the pin. The distances are different because the threaded portion of the pin is not included.

The failures increase dramatically between fifteen and twenty-five inches from the end of the box and ten and twenty inches from the pin shoulder. These are primarily fatigue failures that occur in the MIU taper section of the joints. For the box, slip damage probably accounts for the larger number of failures.

As the curves move beyond the MIU tapered sections into the slip area of the joints below the box, the number of failures in the box end are substantially greater than failures in the pin end of the drill pipe. Note the three sharp upward spikes in the curve for the box between 25–30 inches below the box. These failures in the box are almost certainly due to slip damage.

Figure 1:
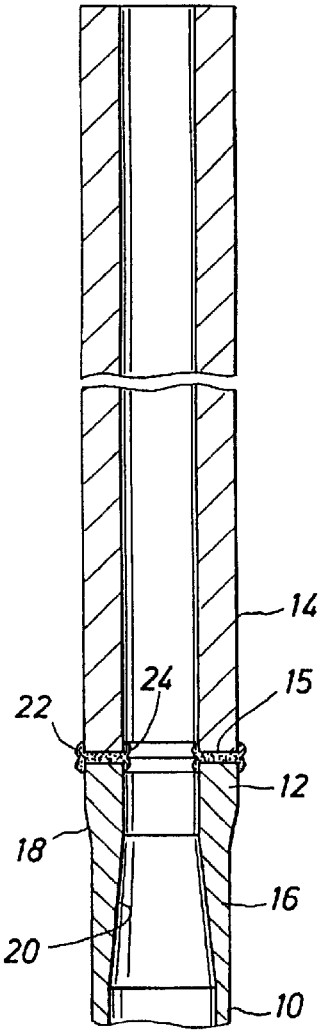
FIG. 1 is cross-sectional view of the upset end of the tube of a drill pipe with a thick-walled tubular protector tube welded thereto.
Figure 2:
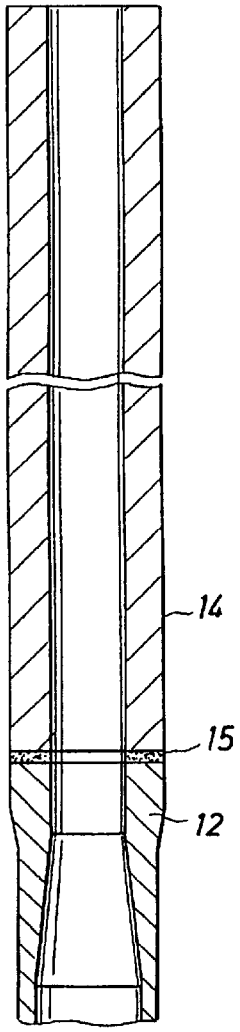
FIG. 2 is a sectional view of the upset end of the tube and the thick-walled member of FIG. 1 after the flash (ram horns) from the weld between the thick-walled protector tube and the upset end of the drill pipe has been removed to provide smooth outer and inner surfaces through the upset end of the tube and the protector tube.
Figure 3:
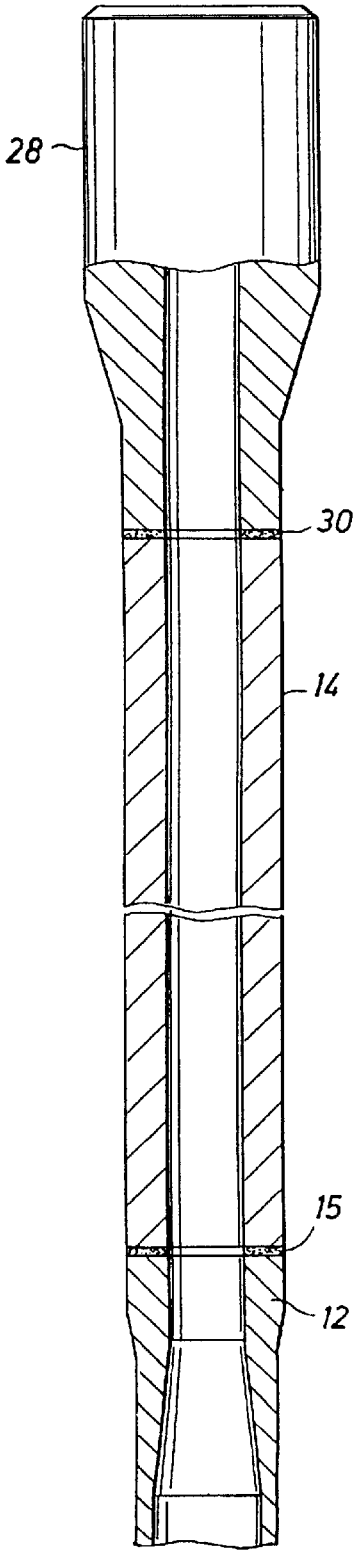
FIG. 3 is a sectional view of the upset end of the tube and the protector tube of FIGS. 1 and 2 with a tool joint box welded to the other end of the protector tube to thereby locate the protector tube in the slip area of the drill pipe.

As stated above, it is an object of this invention to position a thick-walled protector tube in the slip area of the drill pipe used to drill deep oil and gas wells. FIGS. 1–3 illustrate [the steps] *one way* of doing so. First drill pipe tube 10 is internally and externally upset to provide cylindrical section 12 with the same outside and inside diameter as protector tube 14. The protector tube is welded to the upset end of tube 10 using inertia welding. As shown in FIG. 1, forming weld 15 produces flash 22 in the shape of a ram's horn. Both the external and internal ram horns should be removed to provide a smooth bore and external surface as shown in FIG. 2. The internal rams horn is usually removed continuously by a broach during the welding process.

The next step is to weld a tool joint to the other end of thick-walled tubular member 14. In the drawings, in FIG. 3, box 28 is shown welded to the end of thick-walled member 14 by weld 30. The flash from weld 30 is removed in the same way as the flash was removed from weld 15.

If internal ram horn 24 can be removed by a broach extending through the bore of the tool joint and the thick-walled section, then only one weld is required and the thick-walled section can be an integral part of the tool joint weld neck.

Figure 6:
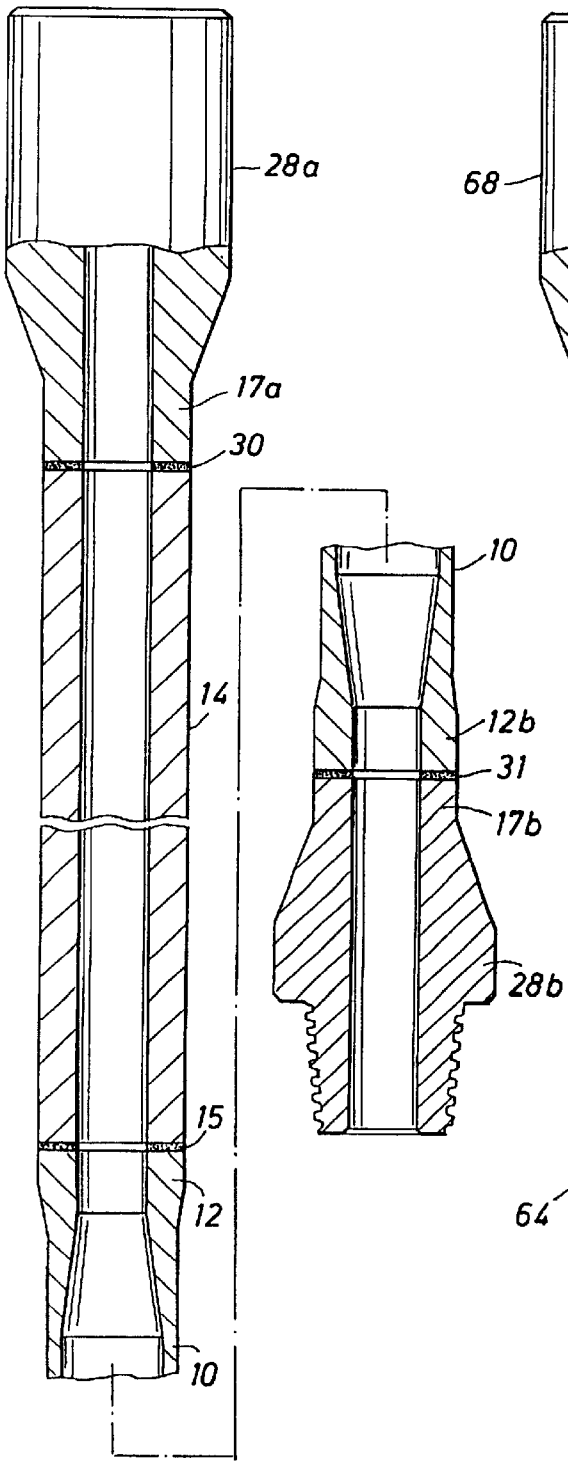
FIG. 6 is a view, partly in section and partly in elevation, of a joint of drill pipe having a thick-walled protector tube located in the slip area.

FIG. 6 is a view partly in section and partly in elevation of joint 14 of drill pipe having a thick-walled protector tube of hard, high tensile strength steel positioned between box 28 and tube 10a.

Figure 7:
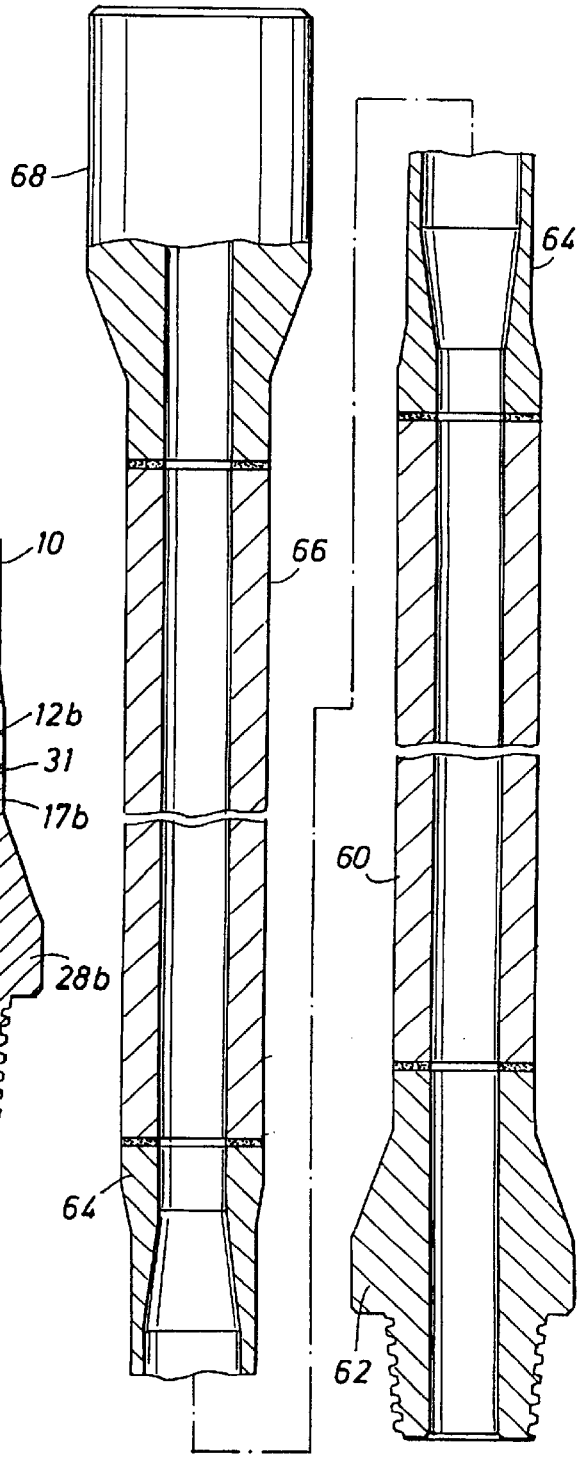
FIG. 7 is a view partly in section and partly in elevation, of a joint of drill pipe having thick-walled protector tubes located in the slip area adjacent the tool joint box and adjacent the pin to allow the joint to be run either box up or pin up.

FIG. 7 is a view partly in section and partly in elevation of a joint of drill pipe having protector tube 60 between tube 64 and pin 62 and protector tube 66 between tube 64 and box 68. This joint can be run pin up as well as pin down and have the protection against fatigue failure due to slip damage in either position.

Figure 4:
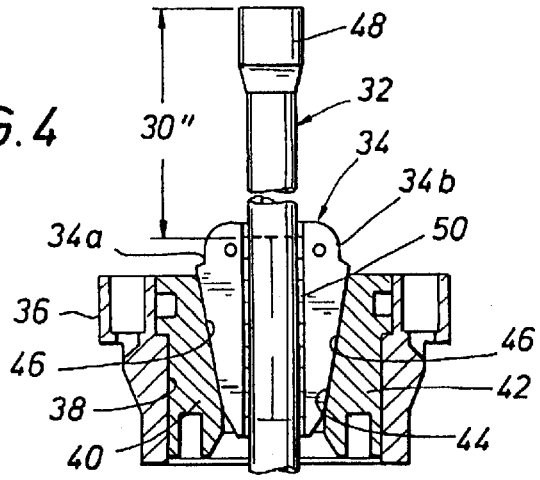
FIG. 4 is a view partially in section and partially in elevation of a rotary table with master bushings and slips in position supporting a drill string.

FIG. 4 is a view, partly in section and partly in elevation showing drill pipe 32 being supported by slips 34. Rotary table 36 has opening 38 to receive split bushings 40 and 42. These bushings combine to provide downwardly tapered, converging surfaces 44 that engage outer tapered surfaces 46 of slip segments 34a and 34b. Usually, the slip assembly will comprise three separate segments that are pivotally connected to wrap around the pipe with space in between each segment. The slips can be hand-operated or power-operated.

The driller will set the slips so that box 48 is about 30" above the slips. Dimension A for long pipe strings will run about 16½. This is the area over which slip inserts 50 engage the pipe. Since tool joint 48, including the weld neck, will be about 18" long, thick-walled section 14 should be about 3 ft. long to insure that the slips are always in engagement with this section of the drill pipe.

The distance the box extends above the slips is important not only to make sure the slips engage the thick-walled section of the drill pipe, but to limit the moment arm through which the tongs exert bending forces on the pipe as they make up and break out the threaded connection between two joints of drill pipe. If the pipe extends above the slips too far, these bending forces could produce stresses that exceed the yield strength of the drill pipe.

[The new drill pipe described above is drill pipe equipped with a protector tube in the slip area that is made of high tensile strength, hard steel such as AISI 4100 Series Chrome-Molly steel with a small, close-knit, Martensite; grain size, i.e., quenched and tempered steel would improve the fatigue life of the drill pipe.] *The new drill pipe described above is drill pipe equipped with a protector tube in the slip area that is made of high tensile strength, hard steel with a small, close-knit martensite, grain size, i.e., quenched and tempered steel, such as AISI 4100 Series chrome-molly steel to improve the fatigue life of the drill pipe.* The pipe with the protector tubes was dubbed "Slip Proof" or SP to distinguish from the drill pipe against which it would be tested which was a joint of drill pipe made by Prideco, Inc. of Houston, Tex. and sold under the registered Trademark "XLT".

Figure 8:
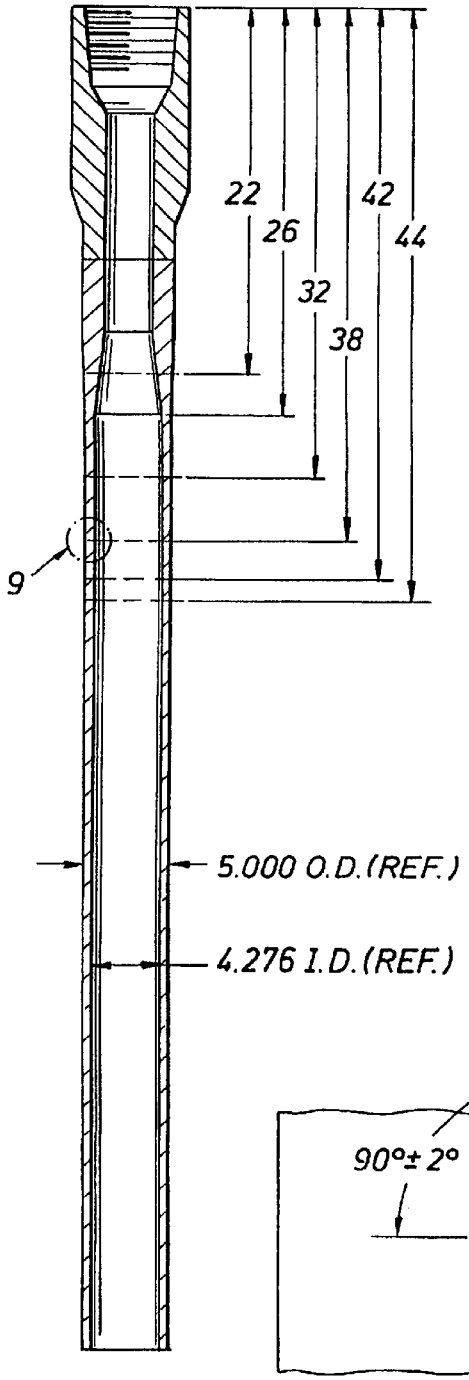
FIG. 8 is a sectional view of the box end of a conventional joint of drill pipe having an extra long internal taper (XLT).
Figure 9:
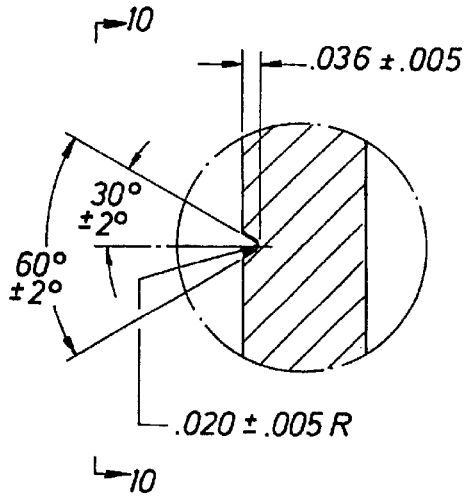
FIG. 9 is a sectional view on an enlarged scale of one of two sets of six identical notches cut into the wall on opposiste sides of the joint in FIG. 8 and equidistant from the end of the joint to simulate the typical notches or slip marks that are made in drill pipe by rotary table slips.
Figure 10:
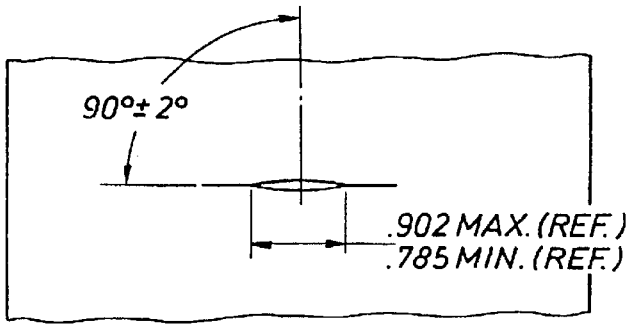
FIG. 10 is a view in elevation of the notch shown in FIG. 9.
Figure 11:
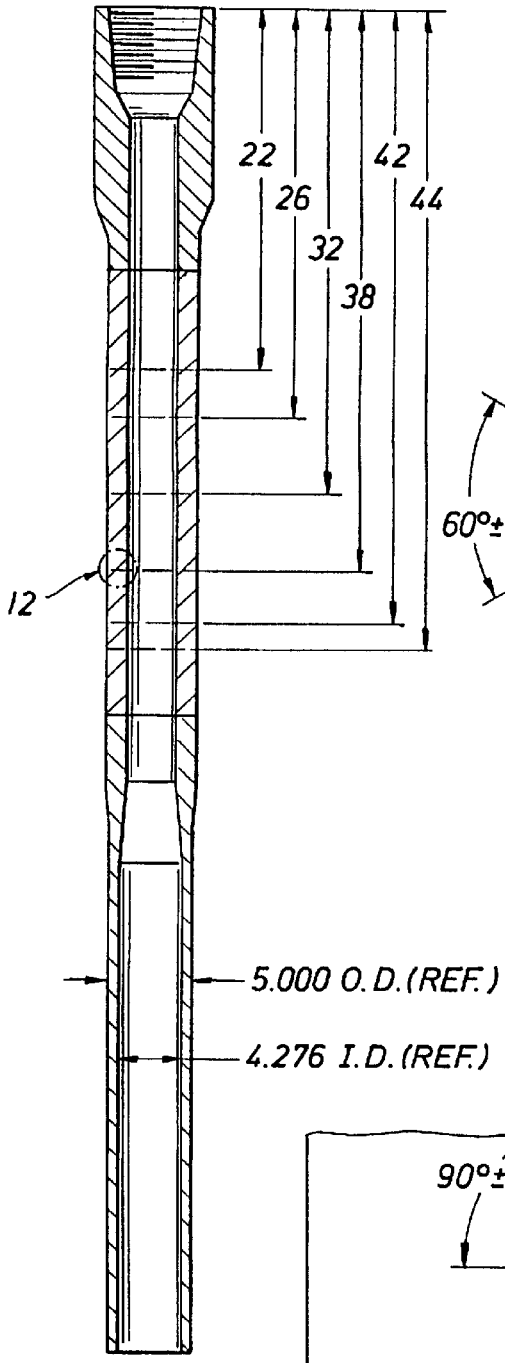
FIG. 11 is a sectional view of the box end of a joint of drill pipe having a thick-walled protector tube in accordance with this invention.
Figure 12:
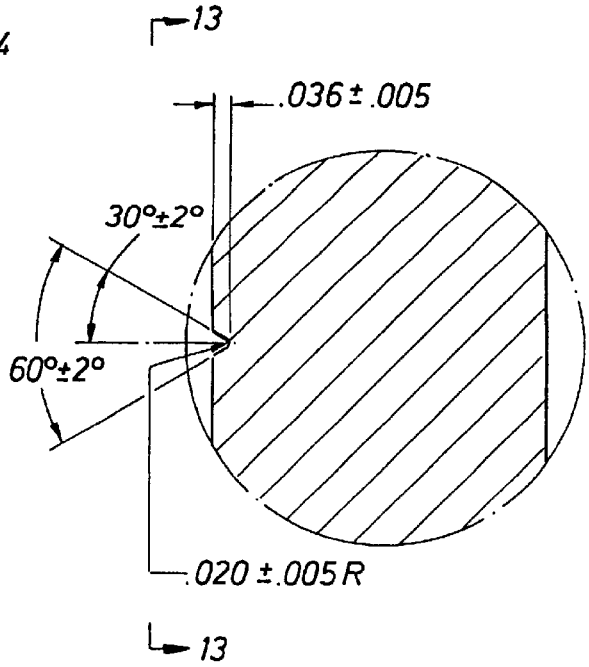
FIG. 12 is a sectional view on an enlarged scale of two sets of six notches that are identical to the notches cut into the wall of the joint in FIG. 8 to simulate the typical notches or slip marks that are made in drill pipe by rotary table slips.
Figure 13:
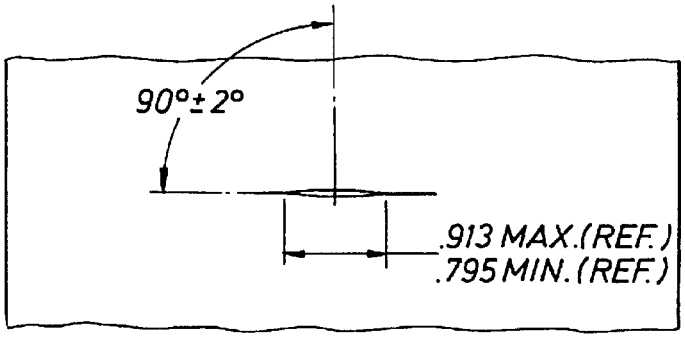
FIG. 13 is a side view in elevation of the notch shown in FIG. 12.

All specimens were notched with identical patterns of six notches on opposite sides and equidistant from the end of the pipe that simulated the notches that would be made by rotary table slips supporting a long string of pipe or where the pipe is moving downwardly when the slips are set or the pipe is rotated after the slips are set. The notches for the XLT pipe are shown in FIGS. 8–10 and the notches for the SP pipe are shown in FIGS. 11–13. The notches in each set of six were all spaced the same distance from the end of the box and of substantially the same dimensions. The wall thickness, of course, of the SP pipe is much greater where the notches were cut than the wall thickness of the XLT pipe.

Eleven specimens were manufactured for this set of tests. There were four variations of species. The first three specimens were standard 5" 19.50 lbs. per foot S135 XLT drill pipe. The specimens were 120" long from the shoulder of the box to the cut end of the pipe. They were machined at the cut end of the pipe to provide a smooth surface for the loading rollers in the test machine.

There were two sets of six notches cut 180° apart in each of the specimens. The dimensions and shape of the notches are shown in FIGS. 9 and 10 for the XLT pipe and FIG. 12 and 13 for the SP pipe. They were cut in a milling machine using a threading insert as the cutting tool in a fly cutter. The threading inserts were used because they provided a means for obtaining a very repeatable radius and angle. This resulted in a 60° flank angle and a 0.020" root radius. They were all cut to 0.036" in depth from touch-off on the surface of the pipe. The depths were confirmed after machining by measuring with a thread depth gauge.

The next three specimens Nos. 4–6 were the new SP design, which included a heavy walled protector tube 32" long positioned between the upset drill pipe tube and the tool joint. This tube was made of high strength Martensitic steel and had a 5⅛" OD and 3¼ ID. As shown in FIG. 11, the same notch pattern was machined in the pipe as was used for specimens 1–3.

Specimens 7–10 were the same as 4–6, except that the bore was enlarged to 3½". Specimen 11 was like specimens 4–6 except it included a stress relief groove in the box tool joint.

Figure 14:
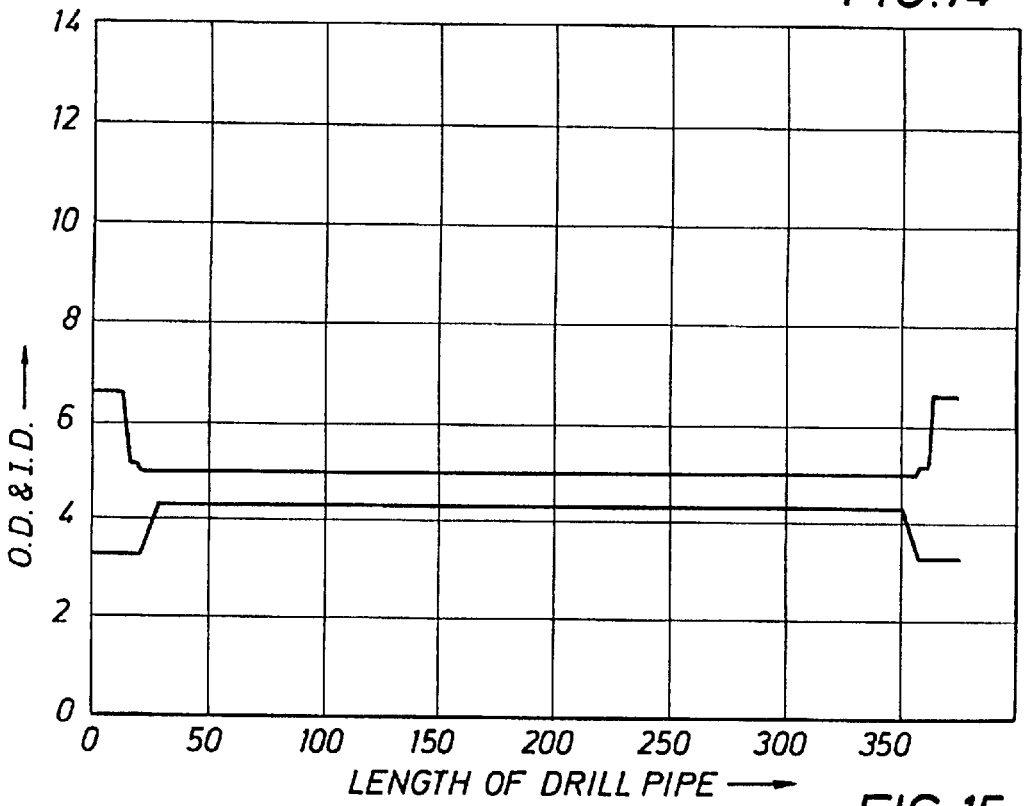
FIG. 14 and FIG. 15 are graphs showing the internal diameters and external diameters of the joints of XLT and Slip Proof (SP) joints of pipe.
Figure 15:
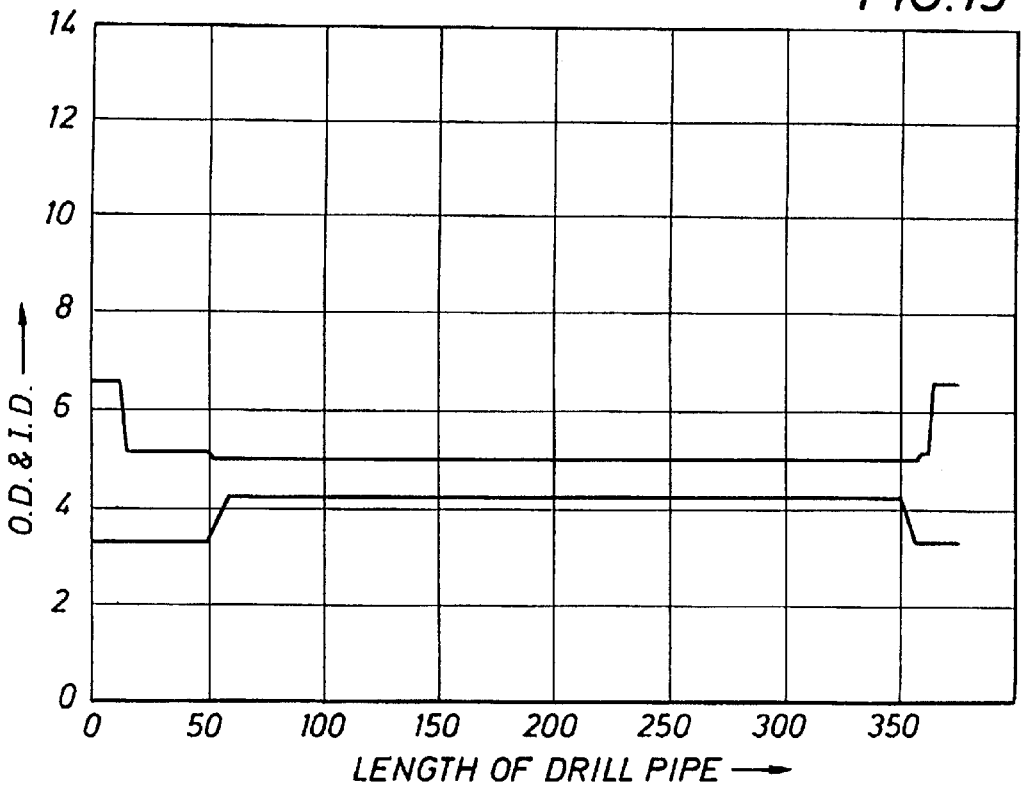
Figures 20, 21:
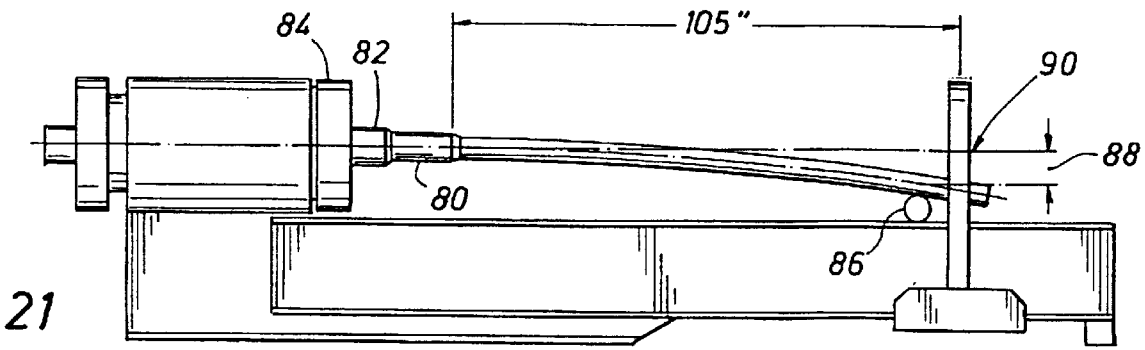
FIG. 20 is a chart of fatigue test run data gathered chronologically.
FIG. 21 is a side view in elevation of the fatigue test equipment.

FIGS. 14 and 15 are graphs of the ID and OD of the XLT and Slip Proof joints for the length of the joints. The fatigue tests were performed using a lathe adapted to serve as a cantilever beam rotary fatigue machine as shown in FIG. 21. For testing, box 80 of each test specimen was made up on mandrel 82. The mandrel was an 8" OD 2 13/16" ID bar with an NC50 pin having a stress relief groove and cold rolled threads. The parts were made up to 30,000 lb-ft of torque. After inserting the mandrel into the chuck 84 and loading roller 90 of the fatigue machine, the chuck and loading roller were adjusted to reduce the total indicator runout of the low end of the pipe to less than 0.025". The TIR was generally less than 0.015", which equates to a cyclic load variation amplitude of about 9 lbs.

A prior set of tests had been performed on XLT 19.50 lb. S135 pipe using a constant deflection for comparison between different test specimens. That same deflection, 1.887" at the load roller of the fatigue machine was used for the standard XLT specimens in this group. This measurement was taken with dial indicator 86 that measured the deflection 88 imposed on the pipe by loading rollers 90. The load required to produce this deflection varied between specimens due to the variation in wall thickness of the specimens. The forces required to produce XLT deflections of 1.887" were

| SPECIMEN | FORCE (lb) |
|---|---|
| 1 | 2190 |
| 2 | 2350 |
| 3 | 2240 |

For a good comparison of fatigue life, it was decided that the hole curvature should be the same for all types of specimens and the loads on the pipe should be in proportion to the loads required to make the pipe fit the same curvature. The logic for this asumption was derived from the fact that, if the curvature is constant, the angular displacement between the tool joints on every joint of pipe must be the same in order for the drill pipe string to follow the curvature. The tool joints may not be tangent to the curve at the shoulder, but the angular displacement increments will all be equal for equal lengths of pipe.

Figure 16:
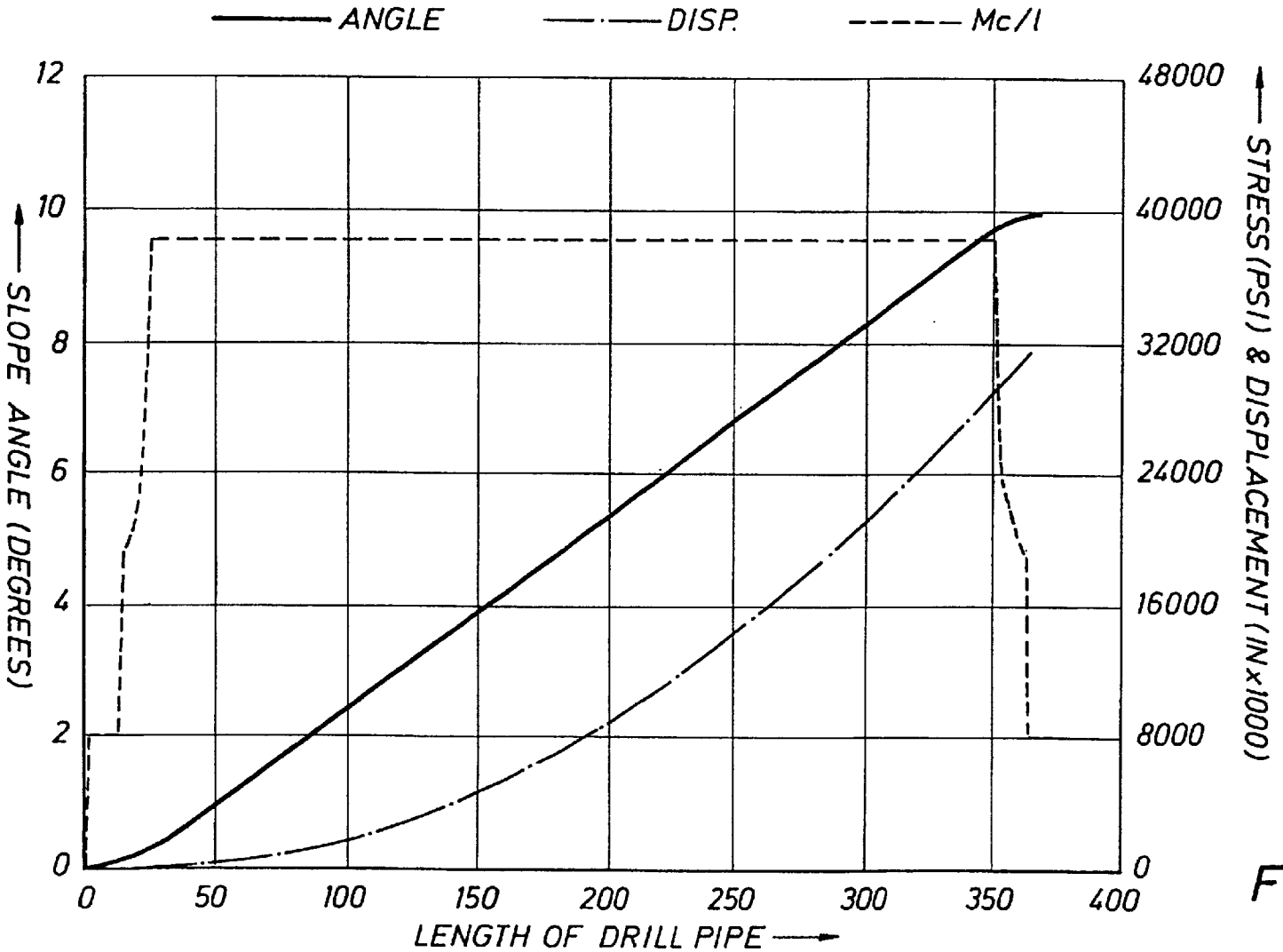
FIG. 16 and FIG. 17 are graphs showing the calculated stress for the two joints of drill pipe in a bore hole of constant curvature.
Figure 17:
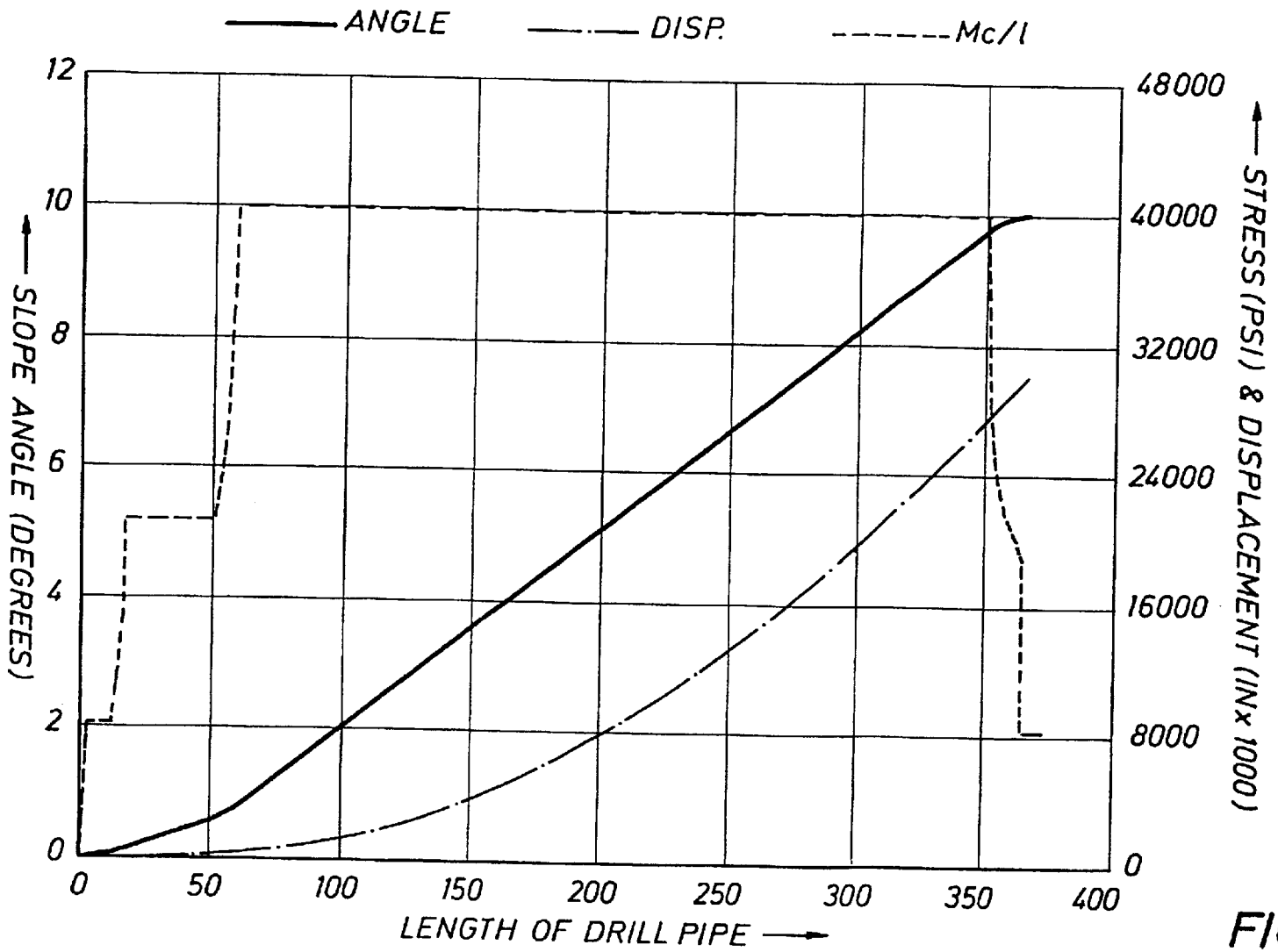

As the first step, a math model was constructed to model a complete joint of XLT pipe. The model was solved to determine the magnitude of the bending moment that was required to rotate the face of the shoulder on one end of a joint of pipe 10° with respect to the shoulder on the opposite end. The 10° value was an arbitrary choice. The values of the angle, displacement from the straight line, and the stress (found from Mc/I) are shown in FIG. 16. Next, a math model for the Slip Proof pipe was developed, the results of which are shown in FIG. 17.

All of the standard XLT drill pipe specimens failed in the second or third notch from the tool joint. All of the Slip Proof pipe specimens failed either in the first notch from the tool joint or in the base of the 18° taper. The specifics were:

| SPECIMEN NUMBER | SPECIMEN TYPE | CRACK LOCATION | CYCLES |
|---|---|---|---|
| 1 | XLT | n3 | 187,430 |
| 2 | XLT | n3 | 184,499 |
| 3 | XLT | n2 | 198,834 |
| 4 | SPT | 18° | 674,005 |
| 5 | SPT | n1 | 1,540,327 |
| 6 | SPT | 18° | 646,713 |
| 7 | SPTb | n1 | 1,101,451 |
| 8 | SPTb | 18° | 620,153 |
| 9 | SPTb | 18° | 441,970 |
| 10 | SPTb | n1 | 1,278,936 |
| 11 | SPT-LS | n1 | 989,821 |

Figure 18:
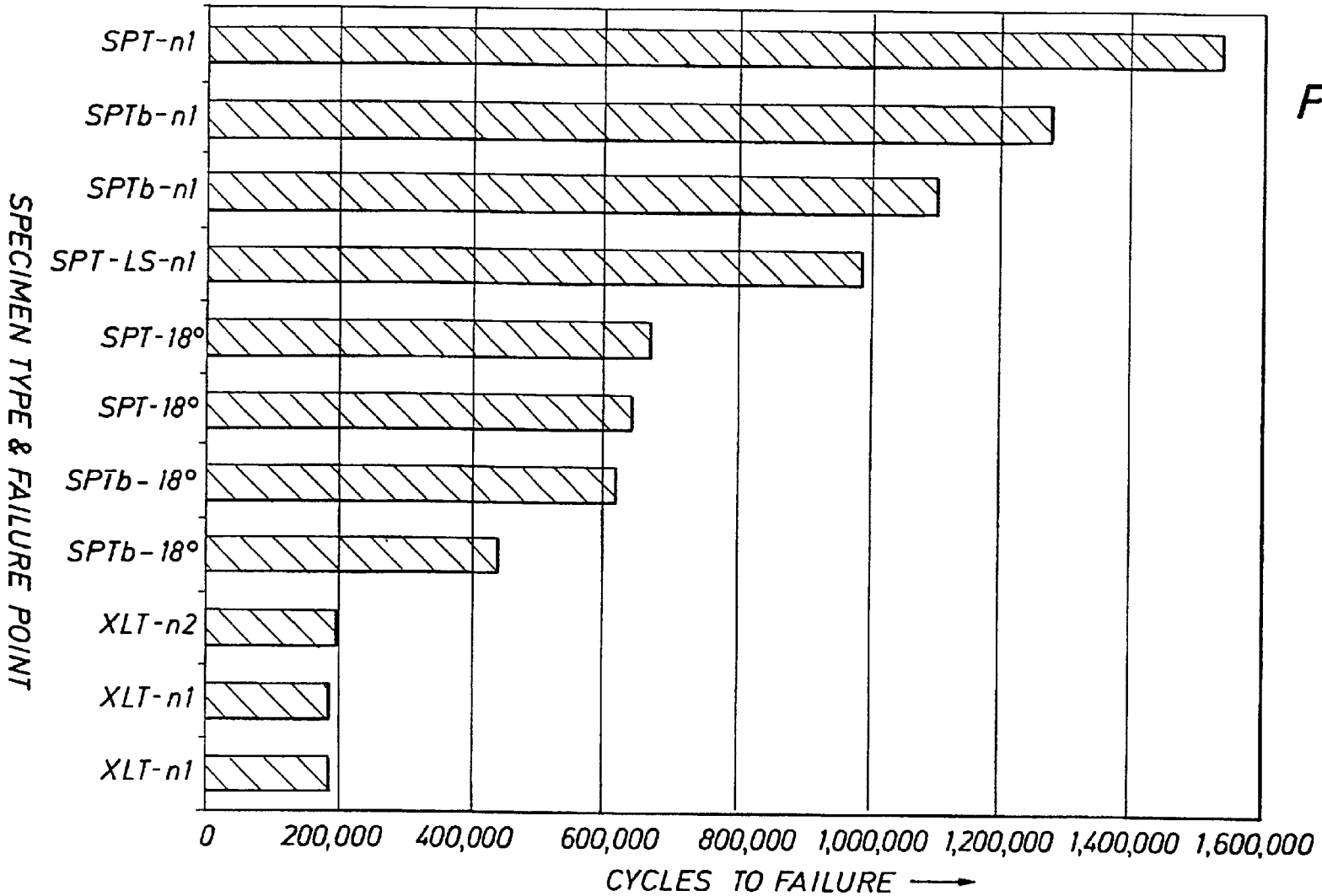
FIG. 18 is a bar chart showing the fatigue life of the notched specimens by increasing life.
Figure 19:
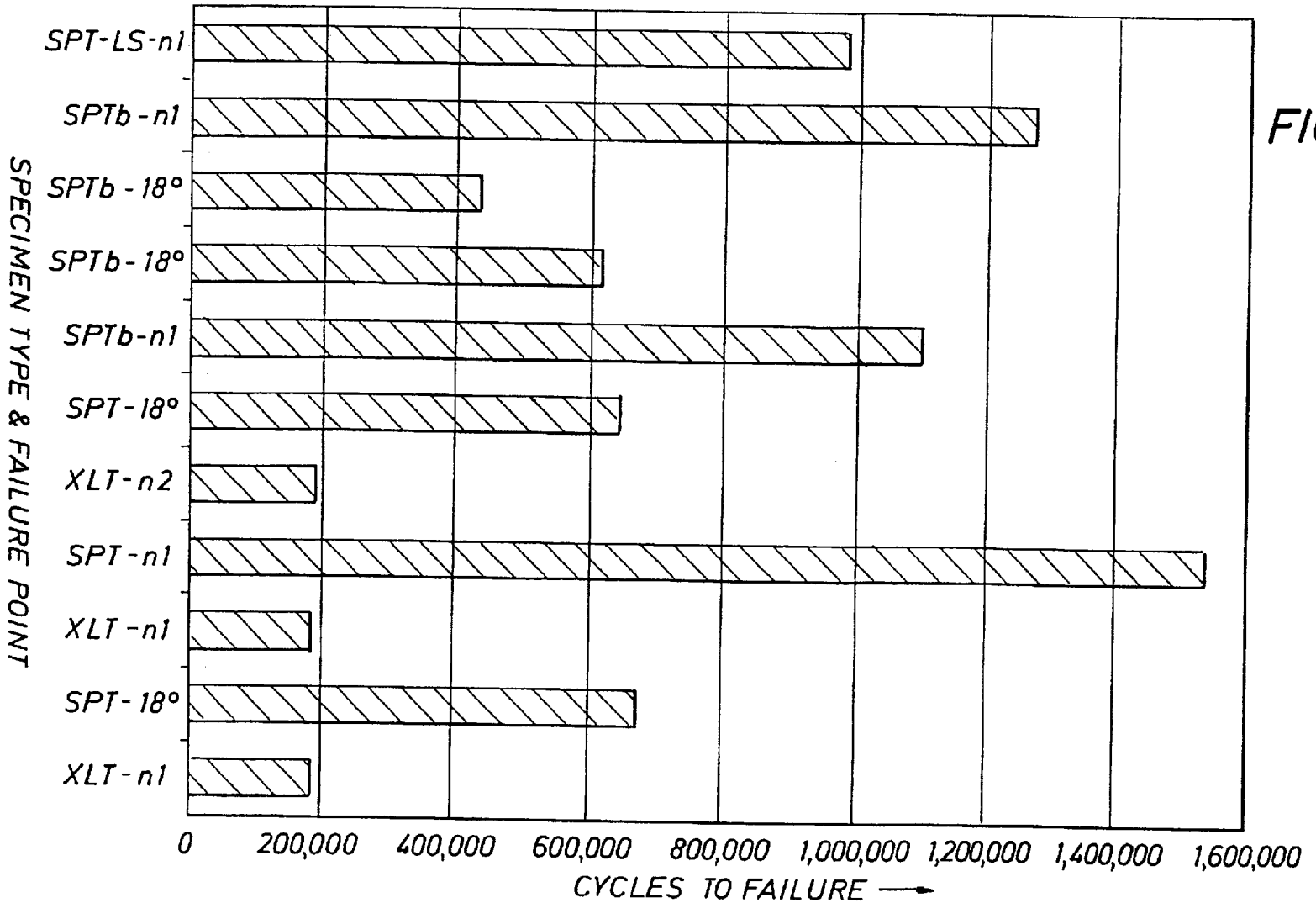
FIG. 19 is a bar chart showing the fatigue life of the notched specimens by chronological order of the testing.

A more detailed presentation of data is shown in FIG. 19. It is in chronological order as is the above table. FIG. 18 shows the same data presented in order of life length.

As mentioned above, the "SPT" specimen had a 5⅛" OD and a 3¼" ID. The "SPTb" specimens had the same OD but [a and a 3¼" ID]*a 3½ ID*. Specimen 11 that had a stress relief groove had a 3¼" ID.

Specimens 1, 2, and 3, the XLT pipe joints failed in either the second or third grooves, i.e., the grooves 26" or 32" from the top of the box.

Specimens 4, 6, 8, and 9 all failed in the 18° taper. After the tests, it was discovered that in each case a notch had been ground inadvertently in the 18° taper when the flash from the weld between the tool joint and the protector tube was ground off. This resulted in a stress riser at that location causing premature failure in the 18° taper. Specimens 5, 7, 10, and 11 with the inadvertent damage to the 18° taper clearly show that Slip Proof drill pipe with the protector tube of this invention will run its full expected fatigue life without failing in notches and marks caused by slips in the rotary table.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. In a fatigue resistant joint of drill pipe for use in a well bore having [upper] *first* and [lower] *second* tool joints, a main steel tubular portion extending [upwardly from] *between* the [lower] *second* tool joint and [terminating near] the [upper] *first* tool joint, the improvement comprising a thick wall rotary slip engaging elongated steel protector tube [connected to and] extending [downwardly] from the [upper] *first* tool joint [and secured] to the [upper end of the] main portion of the drill pipe[;], the protector tube having a greater wall thickness than the main portion of the drill pipe, the protector tube being made of a Martensite steel having a small, close knit, grain size to reduce the penetration of the slip teeth that [engaae] *engage* the protector tube when the [loint] *joint* is supported in the rotary table by slips.

2. The drill pipe *joint* of claim 1 where the protector tube is made of quenched and tempered steel having a hardness of 30–38 $HR_c$.

3. The drill pipe [section] *joint* of claim 2 in which the steel of the protector tube is chrome-molly.

4. The drill pipe [section] *joint* of claim 2 or 3 in which the protector tube is made of AISI 4100 series chrome-molly steel.

*5. The drill pipe joint of claim 1 in which the protector tube is connected to the first tool joint and secured to the end of the main portion of the drill pipe.*

* * * * *